United States Patent [19]

Ditscheid

[11] 3,720,464
[45] March 13, 1973

[54] MICROFILM READER

[75] Inventor: Hans L. Ditscheid, Bonn-Ippendorf, Germany

[73] Assignee: Eastman Kodak Company, Rochester, N.Y.

[22] Filed: Jan. 22, 1971

[21] Appl. No.: 108,829

[30] Foreign Application Priority Data

Feb. 20, 1970 Germany ................ G 70 06 080.9

[52] U.S. Cl. ........................... 353/27, 353/114
[51] Int. Cl. ..................... G03b 23/08, G03b 23/14
[58] Field of Search .......... 353/22, 23, 24, 25, 26, 27, 353/103, 116, 114

[56] References Cited

UNITED STATES PATENTS

| | | | |
|---|---|---|---|
| 3,528,735 | 9/1970 | Bluitt | 353/27 |
| 2,878,604 | 3/1959 | Mulch | 353/116 |
| 2,610,540 | 9/1952 | Beitz | 353/23 |

FOREIGN PATENTS OR APPLICATIONS

| | | | |
|---|---|---|---|
| 1,060,345 | 4/1954 | France | 353/27 |

Primary Examiner—Leonard Forman
Assistant Examiner—A. J. Mirabito
Attorney—W. H. J. Kline and Saul A. Seinberg

[57] ABSTRACT

A microfilm reader having a film gate adapted to receive information carriers therein which can be selectively moved between and to projection and loading positions. The information carriers are individually accommodated in the compartments of a magazine which is movably mounted on the reader to allow indexing of the different compartments with respect to the loading position of the film gate. Each magazine compartment is provided with a recess by which a blocking member, located on the reader in the loading region of the film gate, holds the magazine and compartment from which the information carrier has been extracted in fixed alignment with the holding plates of the film gate when it is moved from its loading position. Blocking action is disenabled by movement of the film gate to its loading position, the holding plates being synchronously opened by such movement and then closed about a selected information carrier when the film gate is moved away from its loading position.

10 Claims, 4 Drawing Figures

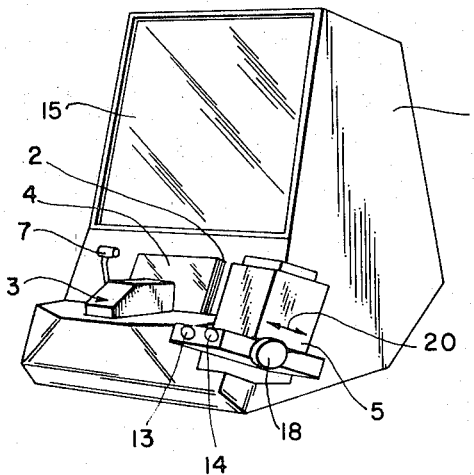
FIG. 1
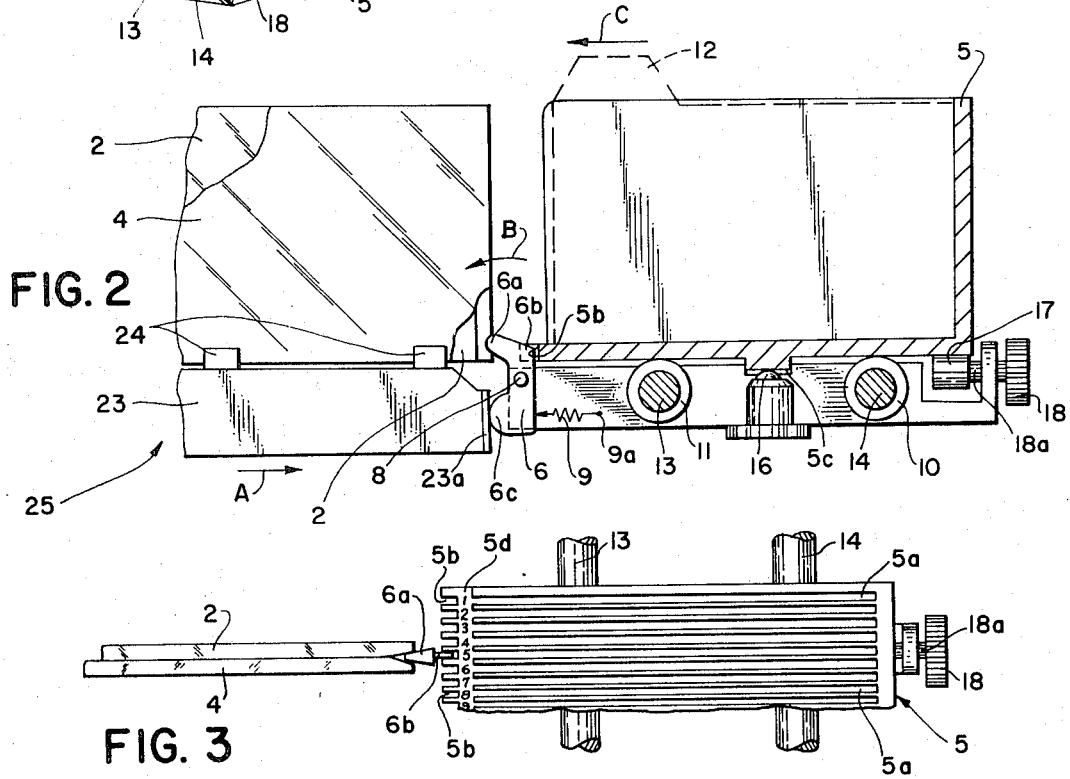
FIG. 2
FIG. 3
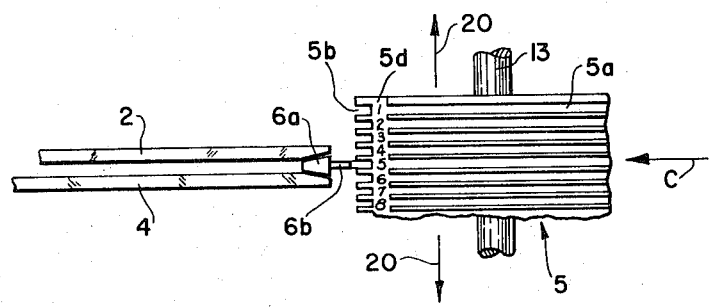
FIG. 4
HANS L. DITSCHEID
INVENTOR.
BY S. A. Seinburg
W. H. J. Kline
ATTORNEYS

MICROFILM READER

BACKGROUND OF THE INVENTION

1. Field of the Invention

This invention relates generally to the field of microfilm readers and, more particularly, to a microfilm reader having a movable filmgate adapted to receive information carriers from an indexable magazine mounted on the reader.

2. Description of the Prior Art

Microfilm readers having slidably mounted magazines, containing information carrying members are known in the prior art. Generally, in these prior art devices, the magazine is slidably mounted on the reader with each of its compartments being movable into the operating region of an information carrier withdrawal device where the information carrier is inserted into operative position between suitably adapted plates. However, such readers are relatively complex and overly sophisticated and are not readily adaptable for lateral withdrawal of information carriers, which would be a decided advantage in simple and more economical readers. French Pat. No. 928,578 discloses such a prior art microfilm reader in which three drive systems are employed to achieve extraction of the desired information from the microfilm. German Utility Model Pat. No. 1,850,213 discloses a slide-changing device for a magazine projector in which the slide-changing device serves to withdraw slides from a magazine and move them into the optical path of a projection system. A blocking spring is provided to prevent movement of the magazine when the slide is in the projection position. The spring action is disabled upon movement of the slide back into the magazine. However, even though this device is suitable for use when slides are employed, it would be unsatisfactory for use in a microfilm reader when the information carriers are to be held in a flat plane between transparent plates which must be spaced apart to permit insertion and withdrawal of the information carrier and in which the plates are moved away from the magazine during viewing.

SUMMARY OF THE INVENTION

It is, therefore, an object of the present invention to provide a microfilm reader in which withdrawal of an information carrier from a magazine can be readily effected by relatively simple and inexpensive means.

It is a further object of the present invention to provide a microfilm reader in which withdrawal of an information carrier from a magazine is accompanied by separation of the reader's transparent plates to facilitate insertion of the information carrier therebetween.

It is another object of the present invention to provide a microfilm reader in which withdrawal of an information carrier from a magazine and the reading thereof is accompanied by locking of the magazine in place to insure reinsertion of the information carrier into the magazine compartment from which it was withdrawn.

Accordingly, there is provided an improved microfilm reader having a film gate adapted to receive information carriers and to be selectively moved to and between loading and projection positions. The reader is provided with a slidably mounted magazine having compartments for removably accommodating the information carriers therein. Each magazine compartment is furthermore provided with a recess into which a projection of a spring-loaded blocking member fits, the blocking member serving to lock the magazine in position with respect to the film gate until reinsertion of the information carrier into the magazine is effected. Another projection on the blocking member serves to maintain the information carrier holding plates of the film gate spaced apart prior to and after reading of the desired information. The blocking member additionally allows closure of the holding plates about the selected information carrier during the reading thereof while synchronously locking the magazine in position.

BRIEF DESCRIPTION OF THE DRAWINGS

FIG. 1 is a perspective view of a microfilm reader in which the present invention may be incorporated.

FIG. 2 is a partial front view of the microfilm reader illustrated in FIG. 1 showing the magazine, the film gate and the blocking member thereof.

FIG. 3 is a top view of the parts illustrated in FIG. 2 wherein the blocking member is shown in the blocking position.

FIG. 4 is a top view of the parts illustrated in FIG. 2 wherein the holding plates of the film gate have been spaced apart by the blocking member.

DESCRIPTION OF THE PREFERRED EMBODIMENT

Referring now to the drawings wherein like reference numerals have been used as necessary in the several views for like elements, FIG. 1 illustrates a reader 1 of a type in which the present invention can be utilized. Reader 1 includes an illuminating and projecting means (not shown), the nature and operation of which is known to those having skill in this art. Reader 1 also includes a ground glass screen 15 and a magazine 5.

Projection station 3 is located, as shown in FIG. 1, at the front of reader 1. Film gate 25, which comprises holding plates 2 and 4, carriage member 23 and plate clamps 24, is movably mounted by any suitable conventional means (not shown) for movement between projection station 3 and magazine 5. Both vertical and horizontal movement of film gate 3 is effected by use of control element 7. Holding plates 2 and 4 are normally urged together by any suitable conventional biasing means (not shown).

Carriage member 23 includes a camming surface 23a which cooperates with camming projection 6c of blocking member 6 when film gate 25 is moved to its loading position adjacent magazine 5, as is illustrated in FIG. 2. Blocking member 6 is pivotally mounted to the reader 1 on pin 8 for rotation thereabout and is biased in a clockwise direction by spring 9, which is itself fastened to reader 1 at 9a. The bias of spring 9 holds blocking member 6 in engagement with a selected one of a plurality of recesses 5b in magazine 5, as is shown in FIG. 3.

Magazine 5 includes a plurality of compartments 5a (see FIG. 3) adapted to each receive information carriers 12, shown in dashed lines in FIG. 2. Each compartment 5a is open at the top and on one side and is provided with a recess 5b and a depression 5c. As noted above, recesses 5b cooperate with blocking member 6. The depressions 5c are engaged by a resiliently mounted detent 16. Detent 16, shown as a spherically-shaped member in FIG. 2, serves to align a magazine compartment 5a with holding plates 2 and 4 of the film gate 25. Magazine 5 is further provided with guide means 10 and 11 which slidably cooperate with the guide means 13 and 14 of reader 1.

Reader 1 further includes a magazine drive system by which the magazine 5 can be indexed comprising a rotary knob 18 and a friction roller 17 mounted to the shaft 18a thereof. Friction roller 17, as shown in FIG. 2, is located beneath one corner of magazine 5 in driving relation therewith. As knob 18 is rotated, the rotational movement of roller 17 is translated into linear motion and magazine 5 is driven thereby along the path indicated by sagittal lines 20 in FIGS. 1 and 3.

In operation, film gate 25, and therefore holding plates 2 and 4, is moved in the direction of arrow "A" by means of control element 7 until camming surface 23a abuts against camming projection 6c of the blocking member 6. As film gate 25 is moved further in the direction of arrow "A," blocking member 6 is swung counterclockwise in the direction of arrow "B," against the bias of spring 9, whereupon retaining portion 6b of blocking member 6 is moved out of whichever recess 5b it had engaged. The wedge-shaped projection 6a of blocking member 6 is synchronously moved between holding plates 2 and 4, thereby spacing plates 2 and 4 apart, as is shown in FIG. 4. If there was an information carrier between holding plates prior to the opening of plates 2 and 4, it is pushed back into magazine 5 by means not shown when the holding plates 2 and 4 have been wedged apart.

Magazine 5 is now moved by means of friction roller 17 until a desired magazine compartment 5a is in alignment with the opening 21 between plates 2 and 4. The desired magazine compartment 5a is now aligned in a lockable position wherein retaining portion 6b of blocking member 6 is aligned with the recess 5b of the selected magazine compartment 5a. To facilitate alignment of the selected magazine compartment 5a with retaining portion 6b of the blocking member, indexing indicia 5d are provided opposite the recesses 5b.

The information carrier 12 is now seized by the operator at one end thereof, which protrudes from magazine 5, and is pushed in the direction of arrow "C" into the opening 21 between plates 2 and 4. Film gate 25 is thereafter moved against or opposite to the direction of arrow "A" by means of control element 7.

As is well known in the art, each information carrier 12 carries a variety of information, such as, for example, descriptive text material, drawings, charts, etc. When a desired carrier 12 has been properly positioned, the information is retrieved in a known manner and appears for reading on the groundglass screen.

During information retrieval, camming surface 23a of film gate 25 is disengaged or moved away from contact with camming projection 6c of the blocking member 6. As a result, blocking member 6 is swung clockwise against the direction of arrow "B" by spring 9 until retaining projection 6b enters the appropriate recess 5b of magazine 5. The engagement of the recess 5b by retaining projection 6b locks magazine 5 against further movement.

Coincident with the entry of retaining projection 6b into the appropriate recess 5b, wedge-shaped projection 6a is rotated up and away from between plates 2 and 4 allowing the plates to firmly close about the selected carrier 12. Since the action of blocking member 6 maintains magazine 5 in a locked position during reading, that is when film gate 25 is moved away from its loading position, re-entry of the selected carrier 12 into the proper magazine compartment 5a is insured. After re-entry, the operation described above can be repeated as desired for any or all of the information carriers 12 stored in magazine 5.

Should it be desired, guide means 10 and 11 can be adapted to permit easy removal of magazine 5 from the reader 1 and the attachment of another magazine. In addition, the friction roller 17 provided for moving magazine 5 could readily be replaced by a rack-and-pinion drive or functionally similar drive means. Furthermore, the indexing indicia 5d can be located at any other point convenient to operator visability. Finally, the ball detent 16 could be replaced by another type of detent.

The present invention has been described in detail with particular reference to a preferred embodiment thereof, however it will be understood that variations and modifications can be effected within the spirit and scope of the invention.

I claim:

1. Apparatus for projecting information carried by information carriers stored in a compartmented magazine having locating detents individually associated with each compartment, said apparatus comprising:
    a. a gate including a pair of openable information carrier holding members which are biased to a closed position for holding the information carrier therebetween;
    b. a projection station at which an information carrier is located for projection of information therefrom wherein the holding members of said gate are in a closed position;
    c. a loading station at which the gate is located to receive an information carrier from a magazine wherein the holding members of said gate are in an open position to receive the carrier;
    d. means for mounting said gate for movement between said projection station and said loading station;
    e. control means for opening said holding members and allowing indexing of a supported magazine in response to movement of said gate to said loading station and for allowing said holding members to close and preventing movement of a supported magazine in response to movement of said gate away from said loading station, said control means including:
        1. a blocking member movably mounted on said apparatus, said blocking member having
            i. a retaining portion adapted to engage one of said compartment detent means of a supported magazine;
            ii. a camming portion located for actuation by said gate, and
            iii. a gate opening portion located for movement between and away from said holding members; and 2. biasing means cooperably associated with said blocking member for urging said retaining portion thereof into locking engagement with one of said compartment detent means of a supported magazine, said retaining portion being movable out of engagement with said compartment detent means by movement of said gate into said loading station to thereby actuate said camming portion, said gate opening means being synchronously movable, by such gate movement, between said holding members to cause separation thereof.

2. Apparatus for projecting information carried by information carriers stored in a compartmented magazine having locating detents individually associated with each compartment, said apparatus comprising:
   a. a gate including a pair of openable information carrier holding members which are biased to a closed position for holding the information carrier therebetween;
   b. a projection station at which an information carrier is located for projection of information therefrom wherein the holding members of said gate are in a closed position;
   c. a loading station at which the gate is located to receive an information carrier from a magazine wherein the holding members of said gate are in an open position to receive the carrier;
   d. means for mounting said gate for movement between said projection station and said loading station;
   e. control means for allowing indexing of a supported magazine in response to movement of said gate to said loading station and for preventing movement of a supported magazine in response to movement of said gate away from said loading station, said control means including:
      1. a blocking member movably mounted on said apparatus, said blocking member having
         i. a retaining portion adapted to engage one of said compartment detent means of a supported magazine; and
         ii. a camming portion located for actuation by said gate; and
      2. biasing means cooperably associated with said blocking member for urging said retaining portion thereof into locking engagement with one of said compartment detent means of a supported magazine, said retaining portion being movable out of engagement with said compartment detent means by movement of said gate into said loading station to thereby actuate said camming portion.

3. Apparatus for projecting information carried by information carriers stored in a compartmented magazine having locating detents individually associated with each compartment, said apparatus comprising:
   a. a gate including a pair of openable information carrier holding members which are biased to a closed position for holding the information carrier therebetween;
   b. a projection station at which an information carrier is located for projection of information therefrom wherein the holding members of said gate are in a closed position;
   c. a loading station at which the gate is located to receive an information carrier from a magazine wherein the holding members of said gate are in an open position to receive the carrier;
   d. means for mounting said gate for movement between said projection station and said loading station;
   e. control means for opening said holding members in response to movement of said gate to said loading station and for allowing said holding members to close in response to movement of said gate away from said loading station, said control means including:
      1. a blocking member movably mounted on said apparatus, said blocking member having
         i. a gate opening portion located for movement between and away from said holding members of said gate; and
         ii. a camming portion located for actuation by said gate, and
      2. biasing means cooperably associated with said blocking member for urging said gate opening portion away from said holding members, said gate opening portion being movable between said holding members to cause separation thereof by movement of said gate into said loading station to thereby actuate said camming portion.

4. In a microfilm reader of the type having a film gate which includes a pair of openable information carrier holding plates biased to a closed position, said film gate being movably mounted in said reader for movement between a projection position and a loading position, and which reader is adapted to receive and movably support a magazine having a plurality of information carrier compartments and further having an indexing recess for each compartment, the improvement comprising control means, mounted on said reader, for opening said holding plates and allowing indexing of a supported magazine in response to movement of said film gate to said loading position and for allowing said holding plates to close and preventing movement of a supported magazine in response to movement of said film gate away from said loading position wherein said control means comprises:
   a. a blocking member pivotally mounted on said reader and having a retaining portion shaped to fit the compartment recesses, a camming projection located for contact by said film gate and a wedge-shaped projection located for movement between and away from said holding plates; and
   b. biasing means cooperably associated with said blocking member for urging said retaining portion thereof into locking engagement with a compartment recess of a magazine mounted in said reader, said retaining portion being movable out of engagement with a mounted magazine recess by movement of said film gate into said loading position and against said camming projection, said wedge-shaped projection being synchronously movable, by such film gate movement, between said holding plates to cause separation thereof.

5. The microfilm reader according to claim 4 which further includes drive means for selectively indexing the compartments of a mounted magazine into and out of alignment with said holding plates.

6. In a microfilm reader of the type adapted to receive and movably support for indexing a magazine having a plurality of information carrier compartments and having an indexing recess for each compartment and which reader includes a film gate adapted to support an information carrier and is mounted for movement in said reader between a projection position and a loading position, the improvement comprising control means mounted on said reader for preventing in response to movement of said film gate away from said loading position indexing movement of a mounted magazine wherein said control means comprises:
 a. a blocking member pivotally mounted on said reader and having a retaining portion shaped to fit the compartment recesses and a camming projection located for contact by said film gate; and
 b. biasing means cooperably associated with said blocking member for urging said retaining portion thereof into locking engagement with a compartment recess when said magazine is mounted in said reader, said retaining portion being movable out of engagement with the recess by movement of said film gate into said loading position and against said camming projection.

7. The microfilm reader according to claim 6 which further includes drive means for selectively indexing the compartments of a mounted magazine into and out of alignment with said holding plates.

8. In a microfilm reader of the type having a film gate movably mounted thereon for movement between a projection position and a loading position adjacent a source of information carriers and including a pair of operable information carrier holding plates biased to a closed position mounted on said film gate, the improvement comprising control means, mounted on said reader and actuated by contact of said film gate therewith when said film gate is moved to said loading position, for spacing apart said holding plates to receive an information carrier therebetween and for allowing said holding plates to close about an information carrier when said film gate is moved away from said loading position wherein said control means comprises:
 a. a blocking member pivotally mounted on said reader having a camming projection located for contact by said film gate and a wedge-shaped projection located for movement between and away from said holding plates; and
 b. biasing means cooperably associated with said blocking member for urging said wedge-shaped projection away from between said plates.

9. A microfilm reader which comprises:
 a housing;
 b. a magazine movably mounted on said housing, said magazine having a plurality of compartments, each compartment adapted to removably accommodate an information carrier therein and each having a recess associated therewith;
 c. a film gate movably mounted in said housing for movement between a projection position and a loading position and including a pair of openable information carrier holding plates biased to a closed position mounted thereon; and
 d. control means mounted on said reader for spacing apart said holding plates to receive an information carrier therebetween and for allowing indexing of said magazine in response to movement of said film gate to said loading position and for allowing said holding plates to close about an information carrier and for cooperating with said compartment recesses to maintain said magazine and the compartment from which an information carrier is extracted in alignment with said holding plates in response to movement of said film gate away from said loading position wherein said control means comprises:
  1. a blocking member pivotally mounted on said housing and having a retaining portion shaped to fit said compartment recesses, a camming projection located for contact by said film gate and a wedge-shaped projection located for movement between and away from said holding plates; and
  2. biasing means cooperably associated with said blocking member for urging said retaining portion thereof into locking engagement with a selected one of said compartment recesses, said retaining portion being movable out of engagement with said selected recess by movement of said film gate to said loading position and against said camming projection, said wedge-shaped projection being synchronously movable by such film gate movement between said holding plates to cause separation thereof.

10. The microfilm reader according to claim 9 which further includes drive means for selectively indexing said magazine and said compartments thereof into and out of alignment with said holding plates.

* * * * *